United States Patent Office 3,442,518
Patented May 6, 1969

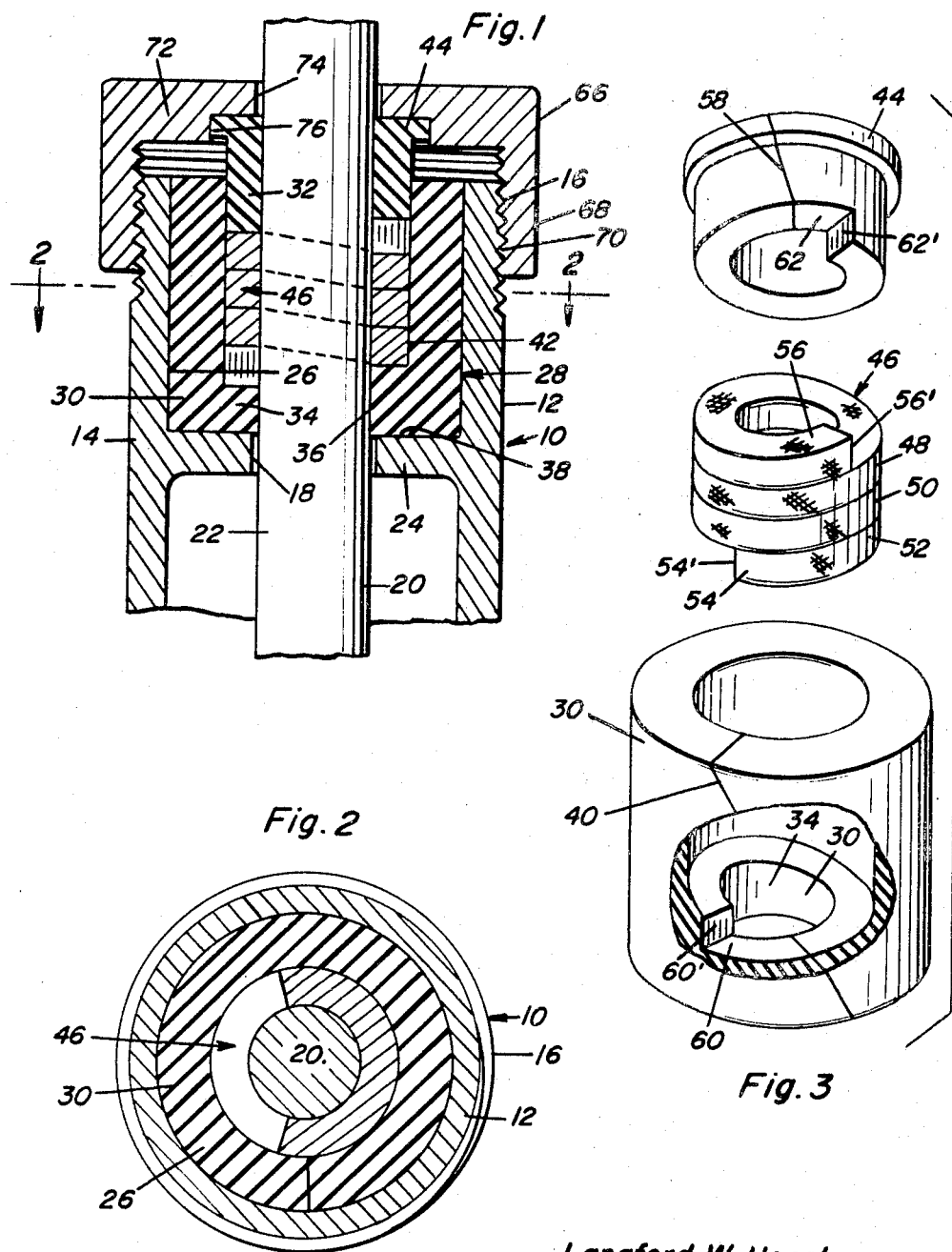
Langford W. Henshaw
INVENTOR.

3,442,518
PACKING FOR STUFFING BOXES
Langford W. Henshaw, Box 1227,
Blackwell, Tex. 79506
Filed May 11, 1966, Ser. No. 549,255
Int. Cl. F16j *15/18, 15/20, 15/16*
U.S. Cl. 277—110    3 Claims

ABSTRACT OF THE DISCLOSURE

A convoluted packing member and a pair of longitudinally split generally annular end members disposed at opposite ends of the convoluted packing member, the opposite terminal ends of the convoluted member conforming to and being snugly seated in circumferentially and axially opening notches formed in the opposing sides of the end members and the remote faces of the end members being disposed generally normal to the longitudinal axis of the convoluted packing member.

---

This invention relates to a novel and useful packing assembly for stuffing boxes and more specifically to a packing assembly including a single packing member which is convoluted in shape and which, when utilized in conjunction with a pair of specifically formed gland forming members, provides a packing assembly that has high resistance to wear, is more adaptable for sealing slightly misaligned shafts, and which is also adapted to readily compensate for slight variances in the diameter of the shaft with which it is operatively associated.

The packing assembly of the instant invention includes a large sleeve having an end wall on one end including a centrally disposed bore for receiving a shaft therethrough and adapted to form one of two gland members between which the convoluted packing member of the assembly is adapted to be axially compressed. The large sleeve is adapted to have the end thereof provided with the end wall telescoped into and seated within a counterbore through which an associated shaft projects. A smaller sleeve defining the second gland member has one end thereof telescoped into the end of the large sleeve remote from the end wall thereof and the convoluted packing member is disposed about the shaft and between the end wall of the large sleeve and the adjacent end of the small sleeve.

Although convoluted packing members have been heretofore utilized and positioned within counterbores through which associated shafts extend and these previously known convoluted packing members have had outer gland forming members associated therewith for axially compressing the convoluted packing member, such packing members have not proven to be a successful as the packing assembly of the instant invention. One improvement of the instant invention over previously known similar types of packing assemblies is that the confronting faces of the end wall of the large sleeve and the adjacent end face of the small sleeve of the instant invention are stepped and conform to the corresponding free ends of the convoluted packing member in a manner such that axial compression of the packing member by urging the smaller sleeve toward the end wall of the larger sleeve results in the convoluted packing member being evenly radially expanded both inwardly and outwardly into tight sealed engagement with the associated shaft and the opposing inner surfaces of the large sleeve, respectively. Further, this type of improved packing assembly has also been found to be advantageous in that the convoluted packing member, when utilized in conjunction with stepped gland forming members, enables a somewhat deformable and resilient convoluted packing member to "flow" slightly toward a less compressed portion or position thereof should one portion or side of the convoluted packing member become too tightly compressed. In addition, the large sleeve portion of the instant invention as well as the small sleeve portion thereof is constructed of deformable resilient material and in this manner the inner surface of the end wall of the larger sleeve and the opposing adjacent end face of the smaller sleeve as well as the inner and outer surfaces of the larger sleeve may yield and be slightly deformed where necessary in order to maintain constant and even axial and radial pressures throughout both gland forming members and the convoluted packing member.

The main object of this invention is to provide an improved packing assembly.

A further object of this invention is to provide an improved packing assembly utilizing a convoluted packing member in combination with opposing gland forming members including opposing faces thereof which are stepped and conform to the shape of the free ends of the associated convoluted packing member.

Still another object of this invention is to provide a packing assembly in accordance with the perceding objects and utilizing gland forming members which are constructed of resilient material thereby enabling substantially even axial and radial pressures to be maintained throughout the convoluted packing member as well as the associated gland forming members.

Yet another object of this invention is to provide a packing assembly in accordance with the preceding objects and constructed in a manner such that it may be readily mounted for use on or removed from operative associated with a shaft at a point on the latter intermediate its opposite ends.

A final object of this invention to be specifically enumerated herein is to provide a packing assembly which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal sectional view taken substantially upon a plane passing through the center of the packing assembly of the instant invention with the latter illustrated operatively associated with a stuffing box through which a shaft projects;

FIGURE 2 is a fragmentary transverse sectional view view taken substantially upon the plane indicated by the section line 2—2 of FIGURE 1; and FIGURE 3 is an exploded perspective view of the packing assembly of the instant invention, portions of the large resilient sleeve member of the packing assembly being broken away and illustrated in section to more clearly illustrate the internal structural features thereof.

Referring now more specifically to the drawings the numeral 10 generally designates a stuffing box including a body 12 defining a generally cylindrical neck portion 14. The free end of the neck portion 14 is externally threaded as at 16 and the neck portion 14 has a bore 18 formed therethrough in which a shaft 20 is disposed. It is to be noted that the shaft 20 includes a smooth outer surface 22 and that the shaft 20 may be either mounted for rotation about its longitudinal axis relative to the body 12 or longitudinal reciprocation relative to the body 12.

The bore 18 is formed through a partition 24 adjacent the outer end of the neck portion 14 and a counterbore 26 is defined in the neck portion 14 outwardly of the partition 24 in which the bore 18 is formed.

The packing assembly of the instant invention is generally referred to by reference numeral 28 and includes a first large sleeve 30 and a second small sleeve 32. The large sleeve 30 includes an annular end wall 34 at one end and has a centrally disposed bore 36 formed therethrough. The large sleeve 30 is snugly received in the counterbore 26 with the end wall 34 abutting against the outer surface 38 of the partition 24. Further, the large sleeve 30 is diagonally slotted as at 40.

The small sleeve 32 has one end snugly telescoped within the outer end of the counterbore 42 defined by the portion of the large sleeve 30 extending away from the end wall 34 thereof and is provided with a diametrically enlarged radially outwardly projecting shoulder 44 on its end remote from the end wall 34.

The packing assembly 28 further includes a convoluted packing member generally referred to by the reference numeral 46 and constructed of any suitable material such as "Teflon," lead or impregnated woven material. The convoluted packing member 46 includes a plurality of convolutions 48, 50 and 52 and each convolution thereof is generally rectangular in shape so that its outer and inner surfaces may readily conform to the cylindrical surfaces of the counterbore 42 of the shaft 20 and its upper and lower surfaces may readily conform to the adjacent lower and upper surfaces of adjacent convolutions. Still further the packing member 48 includes free opposite end portions 54 and 56 including end faces 54′ and 56′, respectively, which are generally coplanar with corresponding radial planes containing the longitudinal axis of the packing member 46.

The small sleeve 32 is diagonally slotted as at 58 and the inner surface of the end wall 34 and the opposing end face of the small sleeve 32 are stepped or notched as at 60 and 62 so as to conform to the corresponding end portions 54 and 56 of the packing member 46. Further, the stepped portions 60 and 62 include radially extending faces 60′ and 62′ which are adapted to abut the end faces 54′ and 56′ in surface to surface contacting engagement therewith.

The stuffing box 10 includes an end cap 66 including a cylindrical portion 68 internally threaded as at 70 and also an outer end wall 72 having a centrally disposed bore 74 formed therethrough which is coaxial with the bore 18. The end cap 66 is threadedly engaged on the externally threaded outer end portion of the neck portion 14 and the bore 74 includes an inwardly opening counterbore 76 in which the shoulder 44 is seatingly receivable.

In order to install the packing assembly 28, the large sleeve 30 is first spread open and then laterally engaged with the portion of the shaft 20 disposed outwardly of the neck portion 14. Then, the large sleeve 30 is slid axially of the shaft 20 into seated engagement with the partition 24. Then, the packing member 46 is coiled onto the shaft 20 and slid longitudinally of the latter into seated engagement with the inner surface of the end wall 34 with the end portion 54 of the packing member 46 having its end face 54′ in surface to surface abutting engagement with the face 60′. Thereafter, the small sleeve 32 is spread open and laterally engaged with the shaft 20 outwardly of the neck portion 14 and thereafter slid longitudinally of the shaft 20 with the end thereof remote from the shoulder 44 telescoped into the end of the large sleeve 30 remote from the end wall 34 thereof. Thereafter, the end cap 66 may be moved axially of the shaft 20 and threadedly engaged with the externally threaded end of the neck portion 14 so as to apply axial thrust on the small sleeve 32. This axial thrust, inasmuch as the sleeves 30 and 32 are constructed of deformable resilient material such as rubber and the packing member 46 is also constructed of a reasonably flexible material which may be at least slightly deformed, causes the small sleeve 32 to be axially compressed and thus radially expanded into snug engagement with the adjacent outer surfaces 22 of the shaft 20 as well as the confronting surfaces of the counterbore 42. In addition, the packing member 46 is both axially compressed and radially expanded whereby the packing member 46 will be expanded into tight engagement with the shaft 20 and the counterbore 42. Of course, radial expansion of the packing member 46 will cause the large sleeve 30 to be expanded slightly into tight frictional engagement with the counterbore 26. Further, the axial thrust applied by the end cap 66 will also urge the end wall 34 axially into tight engagement with the partition 24.

Inasmuch as the inner face of the end wall 34 is stepped and shaped to conform to the end convolution 52 of the packing member 46 and the opposing end face of the small sleeve 32 is similarly shaped to conform to the end convolution 48, it may be seen that substantially all exposed surface portions of the packing member 46 are opposed by either the cylindrical outer surface 22 of the shaft 20 or correspondingly shaped surfaces of the large and small sleeves 30 and 32 and the opposing surfaces of adjacent convolutions. Further, the end cap 66 is provided with right hand threads and the packing member 46 is right hand wound, see FIGURES 1 and 3. Therefore, tightening the end cap 66 on the neck portion 14 results in the inherent friction between the opposing faces of the cap 66 and small sleeve 32 tending to rotate the sleeve 32 in a right hand direction thus insuring full seating of the faces 62′ and 56′, at least slight longitudinal compression of the convoluted packing member 46 and seating of the faces 54′ and 60′. This full surface to surface contact of all surface portions of the packing member 46 with opposing surfaces of the associated shaft, the large and small sleeves 30 and 32 as well as adjacent convolutions of the packing member ensures that the pressures applied to the packing member will be so applied evenly throughout the entire packing member. It is this distribution of pressures which affords the improved operation of the packing member 46 of the instant invention and enables the packing member 46 to tighten about the associated shaft 20 in a manner which is not unlike the manner in which the boa constrictor coils about is prey and readily conforms to the surface irregularities thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with body means defining a generally cylindrical bore extending therethrough and a shaft extending concentrically through said bore, a pair of opposite end wall means supported from said body means and defining opposing end walls for said bore and receiving axially spaced portions of said shaft therethrough, at least one of said end wall means being supported from said body means for movement toward and away from the other end wall means, whereby to compress seal means for said shaft disposed between said end wall means, an elongated packing assembly structure including a convoluted portion disposed about said shaft and longitudinally split generally annular end portions also disposed about said shaft at the opposite ends of said convoluted portion and abutted against said end wall means, said convoluted portion including opposite terminal ends and said end portions each defining a circumferentially and axially opening notch conforming to and in which the corresponding terminal end of said convoluted portion is seatingly received, said notches each being, in part, defined by the adjacent end of a convoluted ramp surface conforming to the opposing surface of the corresponding convolution, said convoluted portion and said end portions defining contiguous inner cylindrical surfaces disposed in sealed engagement with the opposing outer surface portions of said shaft and outer cylindrical surfaces disposed in sealed engagement with the opposing surfaces of said bore, said convoluted portion and annular end portions being maintained under axial compression between said end wall means whereby they are radially expanded into tight frictional engagement with the external surfaces of said shaft and the opposing internal surfaces of said bore, one of said end portions being defined by an annular end wall portion of a generally cylindrical sleeve portion constructed of resilient deformable material and snugly disposed in said bore and in which said convoluted portion is snugly telescopingly received, said end wall portion having the corresponding notch formed therein, the other of said end portions including a second sleeve portion constructed of resilient deformable material snugly telescoped into the end of the first-mentioned sleeve portion remote from the annular end wall portion thereof, the other of said notches being formed in the end of said second sleeve portion adjacent said convoluted portion, said one end wall means being supported from said body for threaded advancement toward the other of said end wall means in response to rotation of said one end wall means relative to said body means about the longitudinal axis of said bore in a direction corresponding to the direction in which said convoluted portion is wound.

2. The combination of claim 1 wherein said sleeves are longitudinally split along paths inclined at least slightly relative to the longitudinal axes of said sleeves.

3. The combination of claim 2 wherein said convoluted packing member includes more than two full continuous convolutions.

References Cited

UNITED STATES PATENTS

| 990,841 | 5/1911 | Collins | 277—104 |
| 2,126,007 | 8/1938 | Guiberson et al. | 277—123 X |
| 2,539,996 | 1/1951 | Gleitz | 277—111 |
| 2,866,217 | 12/1958 | Dean | 277—203 X |

FOREIGN PATENTS

| 17,989 | 1907 | Great Britain. |
| 1,200,245 | 12/1959 | France. |
| 1,308,728 | 10/1962 | France. |

LAVERNE D. GEIGER, *Primary Examiner.*

J. S. MEDNICK, *Assistant Examiner.*

U.S. Cl. X.R.

277—123, 203